Dec. 19, 1944.   J. R. POLIZZI   2,365,433
LOCK NUT
Filed Sept. 6, 1944
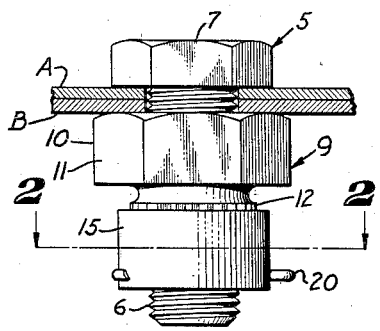
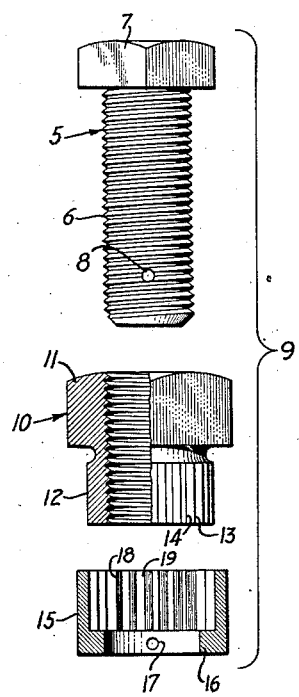
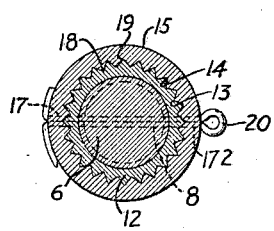
INVENTOR.
JOSEPH R. POLIZZI.
BY
ATTORNEY.

Patented Dec. 19, 1944

2,365,433

UNITED STATES PATENT OFFICE 2,365,433

LOCK NUT

Joseph R. Polizzi, Los Angeles, Calif.

Application September 6, 1944, Serial No. 552,883

8 Claims. (Cl. 151—28)

This invention relates to nut and bolt fasteners and more especially to a lock nut for a screw thread or bolt.

An object of the invention is to provide a simple, practical and efficient lock nut of the character described.

Another object of the invention is to provide a lock nut construction adapted for locking in any of a large number of angular positions, permitting fine adjustments.

Another object of the invention is to provide an improved type of lock nut having cotter pin features adapted for angular settings of less than the conventional 60 degree intervals.

Other objects and advantages will appear and be brought out more fully in the following specification, reference being had to the accompanying drawing wherein Fig. 1 is an elevation view of a bolt and lock nut embodying my invention, showing the same in use.

Fig. 2 is a sectional view taken along the line 2—2 of Fig. 1, and

Fig. 3 is an exploded view showing the bolt and nut parts.

This invention is for an improvement in lock nut construction and presumes to overcome an important objection found in conventional lock nuts of the castellated type wherein the upper annular portion is slotted or castellated along three equally spaced diameters for a cotter pin whereby the nut may be set or locked by the cotter pin at any of six angular positions spaced 60 degrees. In many instances the thread pitch of the nut and bolt is such that it is desirable for the nut to be locked in positions spaced considerably less than the just mentioned 60 degree angular spacing, and the present invention discloses a lock nut structure capable of having the nut locked in any of a large number of angular spacings such as 10 to 5 degrees or from 20 to 40 angular positions.

Referring more particularly to the drawing I show a bolt and lock nut construction wherein is shown a bolt 5 having a threaded shank or stem 6, and a hexagonal head 7, the shank being provided with one or more cross bores or holes 8 through which a cotter pin may be inserted. The invention is shown applied to a bolt, however it will be understood that the invention may be applied as well to a stud or any threaded element provided with a cotter pin hole.

The lock nut comprising the invention is indicated as an entirety at 9 and comprising a main nut member 10 having a hexagonal body 11 to which a wrench is applied, and is further provided with an annular extension portion 12 which is provided with a plurality of grooves 13 forming ribs or splines 14.

A locking sleeve 15 is provided having a central opening of larger diameter than the threaded portion 6 of stud 5 so as to be slidable thereover, and has an annular portion 16 provided with a pair of diametral cotter pin holes 17. Sleeve 15 has an annular extention portion having a plurality of internal grooves and splines 18 and 19 adapted for complimentary and slidable engagement over and on extension 12 and the grooves 13 and splines 14 thereof.

Figs. 1 and 2 show the invention in use wherein a pair of plates A and B are clamped between bolt head 7 and main nut 10 and as nut 10 is so positioned sleeve 15 is slidably positioned over the threaded portion 6 of the bolt and slidable engagement effected between grooves and splines 13 and 14 and 18 and 19, it being understood that sleeve 15 is so positioned angularly that cotter pin holes 17 will register with hole 8 of the bolt so that cotter pin 20 may be passed therethrough and suitably secured. If it is desired to back off or advance nut 10 for a looser or tighter fit, pin 20 may be removed and sleeve 15 slid off, nut 10 turned by one or more of the angular positions of the grooves and splines and sleeve 15 replaced and cotter pin 20 re-inserted. In this manner it will be clear that there is provided by this invention a lock nut having adjustable positions of small angular differences, the actual number of which may be whatever is desired by the particular type of use.

Having thus described my invention, what I claim and desire to secure by Letters Patent is:

1. A lock nut for a bolt having a cotter pin aperture, said nut having an annular extension formed with a plurality of axial grooves, and a ring having a plurality of grooves for interfitting engagement with said nut grooves and diametral cotter pin holes.

2. A lock nut for a bolt having a cotter pin aperture, said nut having an annular extension formed with a plurality of external axial grooves, and a ring having a plurality of internal grooves for interfitting engagement with said nut grooves and diametral cotter pin holes.

3. A lock nut for a bolt having a cotter pin aperture, said nut having an annular extension formed with a plurality of axial grooves, and a ring having a plurality of grooves for slidable interfitting engagement with said nut grooves and diametral cotter pin holes.

4. A lock nut for a bolt having a cotter pin aperture, said nut adapted to be screwed forwardly against an element to be held and having a rearward splined extension, a ring member slidable on said bolt and having a splined extension for interfitting engagement with said nut extension after the nut has been tightened and having cotter pin holes, and a cotter pin to be positioned in said aperture and holes.

5. A lock nut for a bolt having a cotter pin aperture, said nut having an annular extension formed with a plurality of axial grooves, and a ring having a plurality of grooves for interfitting engagement with said nut grooves and diametral cotter pin holes, said grooves being disposed circumferentially at less than 60 degree intervals.

6. A lock nut for a bolt having a cotter pin aperture, said nut having an annular extension formed with a plurality of axial grooves, and a ring having a plurality of grooves for interfitting engagement with said nut grooves and diametral cotter pin holes, said grooves being disposed circumferentially at less than 30 degree intervals.

7. A lock nut for a bolt having a cotter pin aperture, said nut having an annular extension formed with a plurality of axial grooves, and a ring having a plurality of grooves for interfitting engagement with said nut grooves and diametral cotter pin holes, said grooves being disposed circumferentially at substantially 4 to 5 degree intervals.

8. A lock nut for a bolt having a cotter pin aperture, said nut having an annular extension formed with a plurality of axial grooves, and a ring having a plurality of grooves for interfitting engagement with said nut grooves and diametral cotter pin holes, said extensions each having substantially 10 to 60 grooves.

JOSEPH R. POLIZZI.